United States Patent Office 2,976,315
Patented Mar. 21, 1961

2,976,315
METHOD FOR THE PREPARATION OF TRIALKYL BORATES

Carlos M. Bowman, Midland, Mich., assignor to The Dow Chemical Company, Midland, Mich., a corporation of Delaware No Drawing. Filed Mar. 2, 1959, Ser. No. 796,298

6 Claims. (Cl. 260—462)

This invention relates to a method for the preparation of trialkyl borates. These compounds have the general formula:

wherein R is a lower alkyl radical containing from 1 to 8 carbon atoms.

Most of the known methods for preparing lower alkyl borates necessarily involve the separation of the borate from an alcohol-alkyl borate azeotrope. This separation of the alkyl borate is both troublesome and time-consuming. In the method of the present invention, however, alkyl borates may be prepared whereby the desired product is obtained directly in high yields and in a highly pure state without the necessity of separating a troublesome azeotrope.

The method of the present invention includes the reacting of boric oxide, $B_2O_3$, with a lower alkyl orthoformate having the formula:

wherein R is a lower alkyl group containing from 1 to 8 carbon atoms, and heating the reaction mixture to the distillation temperature of the first fraction, usually between about 0° and about 200° C. A distilled fraction is thereby removed from the reaction flask. Removal of any subsequent fractions containing by-products of the reaction and any unreacted portion of the starting materials, may also be accomplished by a similar distillation.

A mole ratio of approximately 3 to 1 orthoformate to boric oxide is desirably employed, although ratios in the range of 1 to 1 to 6 to 1 may be employed.

While the distillation is usually accomplished at atmospheric pressures, pressures above and below atmospheric may be employed, if appropriate.

Recovery of the desired product is also accomplished by distillation. Purification of the final product by redistillation may be accomplished, if desired.

The following examples are given to illustrate the present invention, but are not to be construed as limiting the invention thereto.

*Example I*

In a 100-milliliter, round-bottomed flask 14 grams (0.2 mole) of boric oxide and 64 grams (0.6 mole) of methyl orthoformate were placed. The flask was fitted with a fractionating column and a heating mantle, and the reaction mixture distilled. The lowest boiling fraction, consisting principally of methyl formate, distilled over in the range of 32° to 61° C. The desired compound then distilled in the range of 61° to 97° C. and was collected. Redistillation of this second fraction yielded 29 grams (46 percent of the theoretical yield) of trimethyl borate, a water-white liquid boiling at 68° to 70° C. and having an index of refraction, $n_D^{25}$, of 1.350.

*Example II*

In a manner similar to that in Example I, 23 grams (0.3 mole) of boric oxide and 148 grams (1.0 mole) of ethyl orthoformate were mixed and distilled. The lowest boiling fraction, consisting principally of ethyl formate, distilled over in the range of 54° to 90° C. There were then collected 80 grams (55 percent of the theoretical yield) of triethyl borate, a water-white liquid boiling at 117° to 119° C. and having an index of refraction, $n_D^{25}$, of 1.374.

While the above examples describe certain specific starting compounds, other starting compounds may be employed, such as, for example, propyl orthoformate, n-butyl orthoformate, 2-methylpropyl orthoformate, amyl orthoformate, 2-ethylbutyl orthoformate, 3-methylamyl orthoformate, n-hexyl orthoformate, n-heptyl orthoformate, 4-ethylamyl orthoformate, n-octyl orthoformate, 5-methylheptyl orthoformate, and the like, and analogous trialkyl borates obtained therefrom.

Various modifications may be made in the present invention without departing from the spirit or scope thereof, and it is to be understood that I limit myself only as defined in the appended claims.

What is claimed is:

1. A method for preparing trialkyl borates comprising, reacting, at a temperature of between about 0° C. and about 200° C., boric oxide with a compound having the formula:

wherein R is a lower alkyl radical containing from 1 to 8 carbon atoms, removing by distillation at least one fraction from the reaction mixture, and separating the trialkyl borate from the reaction mixture.

2. A method for preparing trialkyl borates comprising, reacting, at a temperature of between about 0° C. and about 200° C., boric oxide with a compound having the formula:

wherein R is a lower alkyl radical containing from 1 to 8 carbon atoms, removing from the reaction mixture by distillation by-products of the reaction and any unreacted starting materials, and separating the trialkyl borate from the reaction mixture.

3. A method for preparing trialkyl borates comprising, reacting, at a temperature of between about 50° C. and about 150° C. boric oxide with a compound having the formula:

wherein R is a lower alkyl radical containing from 1 to 8 carbon atoms, removing by distillation at least one fraction from the reaction mixture, and separating the trialkyl borate from the reaction mixture.

4. A method for preparing trialkyl borates comprising, reacting, at a temperature of between about 50° C. and about 150° C. boric oxide with a compound having the formula:

wherein R is a lower alkyl radical containing from 1 to 8 carbon atoms, removing from the reaction mixture by distillation by-products of the reaction and any unreacted starting materials, and separating the trialkyl borate from the reaction mixture.

5. A method for preparing trimethyl borate comprising, reacting, at a temperature of between about 0° C. and about 200° C., boric oxide with methyl orthoformate, removing from the reaction mixture by distillation any unreacted methyl orthoformate and methyl formate formed as a by-product, and separating the trimethyl borate from the reaction mixture.

6. A method for preparing triethyl borate comprising, reacting, at a temperature of between about 0° C. and about 200° C., boric oxide with ethyl orthoformate, removing from the reaction mixture by distillation any unreacted ethyl orthoformate and ethyl formate formed as a by-product, and separating the triethyl borate from the reaction mixture.

No references cited.